United States Patent [19]

Hutzenlaub

[11] 4,185,397
[45] Jan. 29, 1980

[54] ARRANGEMENT FOR THE DRYING OF SOLVENT AT A DRYING CHANNEL

[76] Inventor: Armin S. P. Hutzenlaub, Am Stichelberg 24, 5276 Wiehl-1, Fed. Rep. of Germany

[21] Appl. No.: 912,014

[22] Filed: Jun. 2, 1978

[30] Foreign Application Priority Data

Jun. 3, 1977 [DE] Fed. Rep. of Germany ....... 2725252

[51] Int. Cl.² ............................................. F26B 21/14
[52] U.S. Cl. .......................................... 34/77; 34/36; 68/18 C
[58] Field of Search ............... 68/18 C, 18 R; 60/648; 34/36, 37, 74, 77, 28, 27, 32; 118/219, 61

[56] References Cited

U.S. PATENT DOCUMENTS

| | | | |
|---|---|---|---|
| 2,367,487 | 1/1945 | Desetti et al. | 34/77 |
| 3,031,771 | 5/1962 | Klint | 34/77 |
| 3,714,719 | 2/1973 | Wayne | 34/74 |
| 3,990,273 | 11/1976 | Scholten et al. | 68/18 C |
| 4,085,518 | 4/1978 | Jackson et al. | 34/77 |
| 4,122,611 | 10/1978 | Marchal et al. | 34/77 |

Primary Examiner—Larry I. Schwartz
Attorney, Agent, or Firm—Bacon & Thomas

[57] ABSTRACT

The arrangement for the drying of solvent at a drying channel with a hot inert carrier medium, under application of compression and adiabatic expansion for the condensation of the solvent, and under reheating of the solvent to the channel temperature is provided in such a manner that a heat exchanger is arranged to follow a compressor for the nitrogen, containing solvent vapor, taken from the drying channel, which heat exchanger is passed through by the carrier medium, drawn from the drying channel and flowing through a pipeline loop, that a condenser arranged follows the compressor for the solvent vapor, on the one hand, feeds the expansion stage, and, on the other hand, is cooled by the nitrogen, cooled in the expansion stage, same being heated to the channel temperature, and that the heated nitrogen is fed into the drying channel. Thereby an energy application as economical as possible in the drying channel is achieved, under general avoidance of external heating.

6 Claims, 1 Drawing Figure

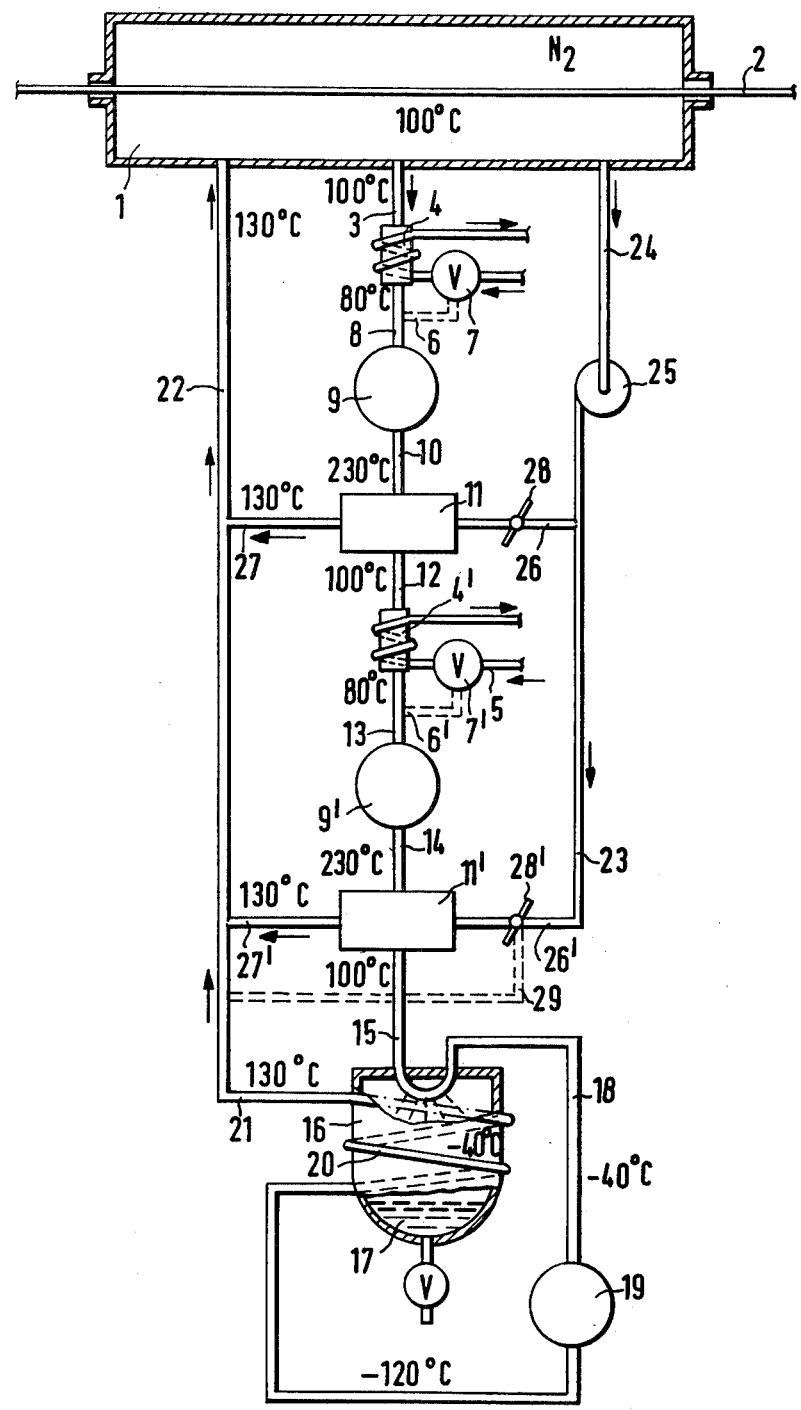

ARRANGEMENT FOR THE DRYING OF SOLVENT AT A DRYING CHANNEL

The invention relates to an arrangement for the drying of solvent at a drying channel with a hot inert carrier medium, under application of compression and adiabatic expansion for the condensation of the solvent, and under reheating of the solvent to the channel temperature.

Such a drying channel or drying tunnel is required in band processing plants of very different types, i.e. lacquering or enamelling plants, laminating devices, coating plants for metal strips and plastics strips. In the drying channel, during the drying of the band, solvents for the medium to be applied become released. These solvents normally are ecologically harmful so that they cannot be blown off immediately to the atmosphere. Furthermore the solvents generally are expensive substances so that for economical reasons a recovery is desirable.

It is known already to work with a closed cycle of an inert gas such as nitrogen, because then higher concentrations of the solvent vapor are permissible. A cooling of the nitrogen below the dew point of the solvent is possible by means of a refrigerating plant. However, such process results in a poor heat utilization, particularly due to the fact that the amount of heat, becoming released in the refrigerating plant, is obtained at a temperature level, scarcely allowing any utilization.

Solvents usually used in different treatment plants are the following: methyl-ethyl-ketone, ethyl-alcohol, isopropyl alcohol, acetone, ethyl acetate, toluene, benzine.

Object of the invention is such a provision of the arrangement of the said kind that an economical operation, particularly in regard to the energy application within the drying channel, is possible.

This object is solved in the case of an arrangement of the said kind in that a heat exchanger is arranged following a compressor for the nitrogen, containing solvent vapor, taken from the drying channel, through which heat exchanger the carrier medium streams, drawn from the drying channel and flowing through a pipeline loop, that a condenser arranged following the compressor for the solvent vapor, on the one hand, feeds the expansion stage, and, on the other hand, is cooled by the nitrogen, cooled in the expansion stage, same being heated to the channel temperature, and that the heated nitrogen is fed into the drying channel.

By this arrangement, in the closed cycle a complete recovery of the solvent is possible. Furthermore, additional channel heating is not necessary. Actually, solely by the said heat exchangers it is possible to heat the nitrogen for the drying channel within a pipeline loop to the required channel temperature. The energy is added exclusively within the compression part as mechanical energy for the drive of the compressor or of the compressors. By this, an extremely economical operation of a drying channel for a band processing installation is achieved. The drying channel may belong to a lacquering or enamelling plant for metal bands, to a coating plant for metal bands or plastics strips, to an installation for adhesive tapes, to enamelling facilities, or the like.

One embodiment of the invention will be described in the following with reference to the attached drawing which shows a block diagram of an arrangement according to the invention.

There is illustrated schematically a drying channel 1, through which a band 2 to be dried moves. The drying channel contains nitrogen $N_2$ as a carrier medium. The temperature of the nitrogen, introduced into the drying channel, is approximately 130° C. The drying channel 1 has heat losses, particularly by the heat capacity of band 2, by radiation, and by the evaporation of the solvent, so that a working temperature of approximately 100° C. appears within the drying channel. At this temperature the drying of band 2, particularly the drying of the coating, occurs, the solvent used for the preceding processing of the band becoming released as solvent vapor. The solvent vapor shall be recovered by condensation.

For this purpose nitrogen is continuously drawn via a bleed pipeline 3 which nitrogen contains solvent vapor. The nitrogen, containing solvent vapor, flows through a chiller 4 which is connected with a water cycle 5. Via a control 6 and a control valve 7 the chiller 4 is adjusted in such a manner that the nitrogen, containing solvent vapor, has, within the pipeline section 8, a maximum temperature of approximately 80° C. which is predetermined by the constructional data of a compressor 9. The compressor 9 effects a compression in the ratio of 1:2.7 so that in the pipeline section 10 a temperature of approximately 230° C. is achieved. The nitrogen, containing solvent vapor, flows through a heat exchanger 11, the cycle of which will be explained in detail in the following. At the outlet side of the heat exchanger 11 a temperature of approximately 100° C. is reached in the pipeline section 12. The nitrogen, containing solvent vapor, flows through a further chiller 4' which corresponds with the chiller 4 and which secures a maximum temperature of approximately 80° C. within the pipeline section 13. There is added a second compressor 9' which corresponds with compressor 9 so that one obtains within the pipeline section 14 a temperature of approximately 230° C. Within a heat exchanger 11', arranged thereafter, a cooling to approximately 100° C. is effected for the pipeline section 15.

The nitrogen, containing solvent vapor, enters a condenser 16 which has a stationary internal temperature of approximately −40° C. so that the solvent vapor is cooled below its dew point and is condensed as a liquid 17. There is added to the condenser 16, via a pipeline section 18, an expansion turbine 19, within which the nitrogen is cooled down by adiabatic expansion to a temperature of approximately −120° C. Such cooled-off nitrogen flows through cooling lines 20 of the condenser 16, and maintains within the condenser 16, the said stationary temperature of −40° C. The nitrogen, serving as coolant, is thereby heated to a temperature of approximately 130° C. so that the nitrogen leaves the cooling line 20 at such temperature of 130° C. within the pipeline section 21. The pipeline section 21 leads to a feed pipeline 22 which leads to the drying channel.

In addition to these stages of operation, connected to bleed pipeline 3, there is provided a pipeline loop 23 which draws, from a pipeline connection 24, nitrogen, containing solvent vapor, from the drying channel 1. For that pipeline loop there is provided a circulating pump 25. The pipeline loop 23 comprises two parallel pipeline branches 26, 26', each of which is connected to the cooling lines of the heat exchangers 11 to 11' and which cool the medium, entering via the pipeline sections 10 and/or 14 respectively the heat exchangers 11 and/or 11' respectively, from the temperature of 230° C. to a temperature of approximately 100° C. Thereby the coolant cools off within the pipeline sections 27 and/or 27' respectively to a temperature of approximately 130° C. For the control of the passage of the coolant, slide valves 28 and/or 28' respectively are provided. Moreover, there is provided a bypass-line 29. The pipeline sections 27 and 27' as well as the pipeline section 21 both end in the feed pipeline 22 of this pipeline loop.

Thus, the heat exchangers 11 and/or 11' render possible a heating of the carrier medium so that thereby a constant temperature within the drying channel is achievable. Furthermore, the cooled nitrogen is heated by the condensation heat, becoming released in the condenser 16. The flow through the pipeline sections 26, 27 and/or 26', 27' is regulated by means of the slide valves 28, 28' in such a manner that the temperature in the pipeline 21 is maintained substantially constant. That is of importance primarily for the start-up operation due to the fact that in the starting phase initially an appreciable condensation in the condenser 16 is not effected. By this adjustment during the starting phase the fluid medium can flow in via the pipeline section 15 at temperatures up to 230° C. into the condenser 16 so that thereby an excessively rapid cooling of the temperature in the pipeline 21 is suppressed.

If necessary, the work becoming released in the expansion turbine may be regained. A negligible application of energy is necessary for the chillers 4 and 4' to cool the nitrogen, containing solvent vapor, to the constructionally predetermined input temperature of the compressors 9 and/or 9' respectively.

The arrangement according to the invention works in a closed cycle and renders possible an operation on the basis of a very low addition of energy. An additional heating is not necessary at all.

The invention will be described on the basis of a design example for a technical plant.

The throughput of the drying channel 1 is V=1 000 Nm³/h. nitrogen. The solvent acetone occurs in an amount of D=100 through 120 kp/h. For the calculation it is taken D=100 kp/h ≙ 38.5 Nm³/h. solvent vapor. The heat of vaporization of acetone is 132.7 kcal./kp. The temperature within the feed pipeline 22 is approximately 120° C.; the temperature within the bleed pipeline 3 is approximately 100° C.

Each compressor is designed for an input temperature $$t_1 = 80° C. \triangleq 353° K.$$

and an output temperature $$t_2 = 230° C. \triangleq 503° K.$$

and has an efficiency $\eta = 0.8$. The enthalpy difference of the compressor is calculated $$\Delta i = R \cdot T_1 \cdot \left(\frac{\mathscr{H}}{\mathscr{H}-1}\right)\left[\left(\frac{P_2}{P_1}\right)^{\frac{\mathscr{H}-1}{\mathscr{H}}} - 1\right] \cdot \frac{1}{\eta} \cdot V$$

whereby R is the universal gas constant, and H is the ratio of the specific heats at constant pressure and constant volume. By the insertion of the numerical values, one obtains:

$$\Delta i = 0.08865 \cdot 353 \cdot 3.5 \left[2.6957^{\frac{1.4-1}{1.4}} - 1\right]\frac{1}{0.8} \cdot 1050$$

$$\Delta i = 47\ 085.89\ kcal/h.$$

The compression ratio of each compressor is as follows:

$$\frac{P_2}{P_1} = \frac{T_2}{T_1} \cdot \frac{\mathscr{H} \cdot \eta}{\mathscr{H}-1} = \left(\frac{503}{353}\right)^{\frac{1}{0.3571}}$$

$$\frac{P_2}{P_1} = 2.6957 \triangleq 2.7.$$

The driving power of each compressor is to be calculated $$P_{eff} = \frac{\Delta i}{0.8} = \frac{54.75}{0.8} \triangleq 68.4\ kw$$

Under consideration of the mechanical losses, the driving motor is rated for a power of 80 kW.

Due to the fact that the two compressors are of identical rating, the total compression is as follows:

$$P_2/P_1 \cdot P_2/P_1 = 7.2668 \triangleq 7.3.$$

The enthalpy difference of the expansion turbine is $$\Delta i = R \cdot T_1 \cdot \frac{\mathscr{H}}{\mathscr{H}-1}\left[1 - \left(\frac{P_2}{P_1}\right)^{\frac{\mathscr{H}-1}{\mathscr{H}}}\right] \cdot \eta \cdot V$$

By putting in the numerical values, one obtains $$\Delta i = 24\ 556.86\ kcal/h.$$

The temperature ratio at the turbine is $$T_2/T_1 = (P_2/P_1)^{0.22857}$$

at an inlet temperature $$T_1 = 233°\ K. \triangleq -40°\ C.$$

the outlet temperature is calculated $$T_2 = 149.73°\ K. \triangleq -123.27°\ C.$$

For the chillers 4 and 4' respectively one calculates at a temperature difference of 10° C. a cooling water requirement of 0.65 m³/h. Consequently, the energy requirements of these heat exchangers may be neglected.

Each heat exchanger 11 and 11' respectively must carry away a heat amount $$Q = (V+D) \cdot c_p \cdot \Delta t$$

By putting in the numerical values, one obtains $$Q = 1\ 050 \cdot 0.311 \cdot (230-100)$$

$$Q = 42\ 451.5\ kcal/h.$$

For the cooling medium of the nitrogen/vapor mixture, there is given a difference in temperature of 30° C. so that therefrom the demand for coolant amounts to $V_{13} = 4\,550\ Nm^3/h.$ The heat amount to be carried away in the condenser consists of 3 portions:
(a) Cooling of the nitrogen/vapor mixture
$Q_a = (V+D) \cdot c_p \cdot \Delta t$ $Q_a = 1\,050 \cdot 0.311 \cdot (140+40)$ $Q_a = 58\,779\ kcal/h.$ (b) Condensation heat of the solvent vapor. Same may be calculated from the difference in temperature within the cooling pipeline and amounts to 18 500 kcal/h.

(c) Cooling of the condensed liquid. This portion is small and may be assumed with 500 kcal/h.

Thus, the total heat amount to be carried away is $Q = 77\,750$ kcal/h. The plant is capable of processing the assumed solvent amount. For the expansion turbine, on the basis of $T_1 = -40°$ C. and $T_2 = -120°$ C. there results a theoretically possible power take-off of 28.55 kW. If required, this power take-off may be taken off at the output shaft of the turbine and may be directed to a utilization.

It is fed into the feed pipeline 22 at three points. If there are small differences in temperature at the feed points, a mixture temperature will result. By means of the slide valves 28 and 28' the temperature in the pipeline sections 27 and 27' as well as the temperature in the pipeline 21 can be adjusted in such a manner that all three temperatures are substantially constant. By this a starting of the plant is made possible, as already described above. In the stationary operation, thus, an adjustment to constant operating values is possible.

The heat requirements for the drying channel are as follows:
(a) Heating of the carrier band having a thickness $s = 25\ \mu m$, a width $b = 1\,500$ mm., a velocity $v = 130$ m./min., $Q = 13\,200$ kcal/h.
(b) Evaporation heat of the solvent
18 500 kcal ≙ 140 kp/h. acetone.
(c) Surface losses at the channel. This value may be influenced by constructional measures, particularly by insulation. In compliance with the above calculation, there are available for this: 49 471 kcal/h. In accordance with the experience gained in the operation, this value is absolutely sufficient.

What we claim is:

1. An arrangement for the recovery of solvents from a solvent carrier medium wherein the solvent and carrier medium mixture is compressed, the solvent is condensed, the medium is expanded and reduced in temperature to be used as a coolant, the arrangment comprising:
   a drying channel containing said mixture, the carrier medium being nitrogen;
   a compressor and means for directing said mixture of solvent and nitrogen from said channel to said compressor;
   a heat exchanger and means for directing compressed mixture from said compressor to said heat exchanger and then to said channel;
   means for directing nitrogen from said channel to said heat exchanger for cooling said compressed mixture and then to said channel;
   a condenser and means for directing cooled mixture from said heat exchanger to said condenser for condensing said solvent vapor; and
   conduit means directing the remaining nitrogen from said condenser into heat exchange relation to said condenser and then to said channel.

2. An arrangement as defined in claim 1 including a second compressor and second heat exchanger serially arranged between said heat exchanger and said condenser.

3. An arrangement as defined in claim 1 wherein means for directing nitrogen from said channel to said two heat exchangers and back to said channel are arranged in parallel in a pipeline loop.

4. An arrangement as defined in claim 1 including a turbine in said conduit means for extracting energy from said nitrogen by expansion thereof before said nitrogen before said nitrogen reaches heat exchange relation to said condenser.

5. An arrangement as defined in claim 2 including a chiller device in each of said means for directing said mixture to said compressors to thereby limit the maximum temperature of mixture delivered to said compressors.

6. An arrangement as defined in claim 3 including a circulating pump in said pipeline loop, said loop including a portion of said conduit means leading from said condenser to said channel.

* * * * *

UNITED STATES PATENT AND TRADEMARK OFFICE
Certificate
Patent No. 4,185,397                                          Patented January 29, 1980

Armin S. P. Hutzenlaub

Application having been made by Armin S. P. Hutzenlaub, the inventor named in the patent above identified, for the issuance of a certificate under the provisions of Title 35, Section 256, of the United States Code, adding the name of Peter Barth as a joint inventor, and a showing and proof of facts satisfying the requirements of the said section having been submitted, it is this 17th day of March 1981, certified that the name of the said Peter Barth is hereby added to the said patent as a joint inventor with the said Armin S. P. Hutzenlaub.

FRED W. SHERLING,
*Associate Solicitor.*